(12) United States Patent
Hall et al.

(10) Patent No.: US 6,877,126 B2
(45) Date of Patent: Apr. 5, 2005

(54) METHOD AND APPARATUS FOR DATA REPRODUCTION

(75) Inventors: Trevor G. R. Hall, Twickenham (GB); Peter Kollig, Southampton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 478 days.

(21) Appl. No.: 10/023,338

(22) Filed: Dec. 18, 2001

(65) Prior Publication Data

US 2002/0083393 A1 Jun. 27, 2002

(30) Foreign Application Priority Data

Dec. 22, 2000 (GB) .............................................. 0031439

(51) Int. Cl.⁷ ...................... G11C 29/00; H03M 13/00
(52) U.S. Cl. ...................... 714/769; 714/785; 714/770
(58) Field of Search .................................. 714/763, 785, 714/769, 770

(56) References Cited

U.S. PATENT DOCUMENTS

| | | | | |
|---|---|---|---|---|
| 4,205,324 A | * | 5/1980 | Patel | ........................... 714/804 |
| 5,465,244 A | | 11/1995 | Kobayashi et al. | ............ 369/50 |
| 5,577,054 A | * | 11/1996 | Pharris | ......................... 714/762 |
| 5,768,243 A | | 6/1998 | Kudo et al. | .................. 369/111 |

FOREIGN PATENT DOCUMENTS

| | | |
|---|---|---|
| EP | 0273384 A1 | 7/1988 |
| EP | 0643388 A1 | 3/1995 |
| WO | 9803755 A1 | 1/1998 |
| WO | 9837555 A1 | 8/1998 |
| WO | 9948097 A1 | 9/1999 |

* cited by examiner

*Primary Examiner*—Joseph D. Torres
(74) *Attorney, Agent, or Firm*—Michael J. Ure

(57) ABSTRACT

A multi-beam optical disc system is disclosed for recording on DVD or CD optical discs. Recorded data includes inner and outer error protection codes applied to data blocks having a predetermined size. Each block comprises several sectors. Multi-channel read-out provides in parallel a set of N sub-sequences, without restriction to the block or sub-block boundaries. Sector ID codes are detected within each channel to identify a series of sub-blocks forming a part of a data block and, even in the absence of data from the start of the block, outer error protection circuitry processes the sub-blocks to accumulate a partial error protection syndrome for the block. Upon reaching the end of the block, a syndrome for a next block within the subsequence is accumulated.

13 Claims, 9 Drawing Sheets

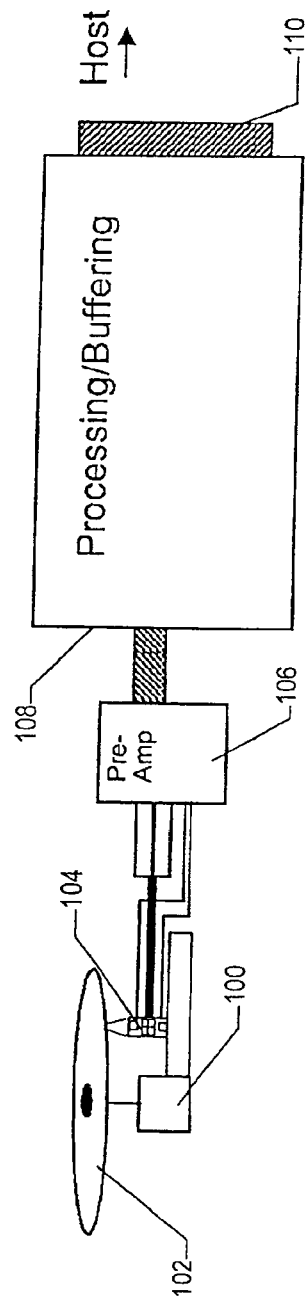
FIG. 1 – PRIOR ART
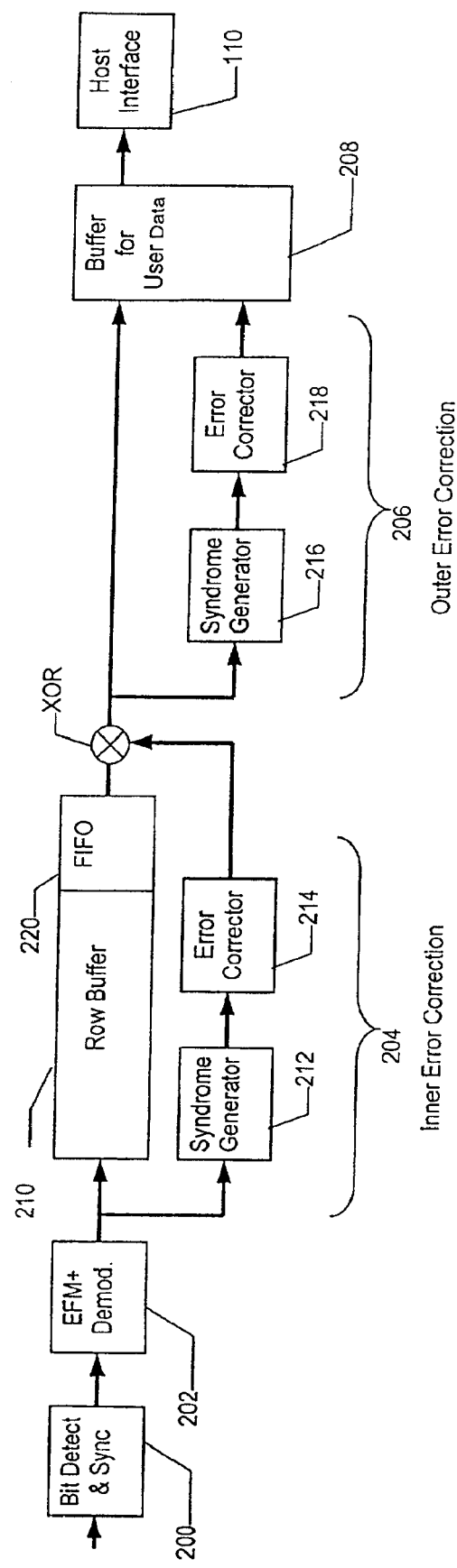
FIG. 2 – PRIOR ART

METHOD AND APPARATUS FOR DATA REPRODUCTION

FIELD OF THE INVENTION

The invention relates to methods and apparatus for data reproduction, and in particular for the retrieval and decoding of data from a rotating carrier such as a Digital Versatile Disc (DVD).

BACKGROUND TO INVENTION

Mass-market optical data storage is familiar in the form of the well-known CD-ROM optical disc format. A historical review and technical description of these and other storage media can be found in The PC Technology Guide, itself available on CD-ROM, and at http://www.pctechguide.com/10dvd.htm. DVD expands upon the capabilities of CD-ROM, in terms of its nominal ("1×") data rate, as well as its data capacity. A DVD/CD decoder is described for example in WO-A-99/48097. Integrated circuits (ICs) incorporating suitable circuitry are available from Philips Semiconductors, for example product SAA7335.

Current CD-ROM drives reproduce the stored data at many times the nominal data rate for which the CD medium was designed, and are designated "24×", "32×", "48×" accordingly. The simplest way to increase data rate is to increase the speed at which the disc spins over the optical pick-up. The race to build ever faster optical disc drives continues, but physical limitations in disc tensile strength, and in the power consumption has put a limit on the spin speed at between 200 and 400 Hz. For DVD, this equates to an "x" rating of 20–40×.

One solution to the problem of delivering an ever higher data rate from a standard optical disc without increasing the spin speed is the so-called "Multi-Beam" approach. In a Multi-Beam system the read-back laser beam is split in an optical pick-up unit (OPU) into a number of separate beams focused on adjacent radial tracks. With an OPU of N beams, the data can be read (in principle) at N times the rate, for a given speed of rotation of the disc. A multi-beam architecture for CD systems is described in WO-A-98/037555 (Zen Research). This description assumes that multi-track read out is achieved using a single laser combined with a diffraction grating which are arranged such that N neighboring tracks are read in parallel. This means that the IC must have N data inputs and is capable of processing N data streams simultaneously. More elaborate arrangements with separate read heads are also known, in the context of CD readers, for example from U.S. Pat. No. 5,465,244 (Kobayashi/Toshiba).

The Multi-Beam approach also brings the possibility of reducing the power consumption of a drive if data rate is not an issue, as for a given data throughput, the disc spin speed can be proportionally reduced by a factor related to the number of beams. This approach gives significant power consumption benefits for portable equipment, as the power consumption of such drives is dominated by the power dissipated by the spindle motor and drivers.

A DVD disc was designed to be read in a linear fashion, and although random access through jumps is part of the system design, the intention is that data is normally read as a stream, i.e. Data is continuous on the track from the start to the end of a file. All the data on a DVD (as is a CD) is arranged on a single spiral track running from the inner disc radius to the outer. If a multitrack approach is used it can be easily seen that the data being read by the individual pick-ups is effectively data from the same linear stream, but temporally shifted by one disc rotation, this means for an N beam system one disc rotation will yield N rotations worth of data. The data from the various pickups needs to be reassembled into one linear data set before passing on to the host application. After one rotation of the disc, the read-back head then needs to jump out N grooves to start acquiring the next consecutive block of data.

A problem arises when one tries to extend the multi-beam concept from CD to DVD drives, however. Like a CD-ROM, the data on a DVD disc is organized into 2 Kbytes sectors. However, while the CD system incorporates essentially a continuous linear code for error protection, DVD adopts a 2-dimensional block-based scheme, in which the sectors are organized for error protection purposes into larger blocks called ECC frames. Each ECC frame occupies a substantial portion of one rotation of the disc, especially at the inner radius of the spiral, and frame boundaries on adjacent tracks are not aligned. Known decoders for DVD assume that a complete ECC frame is received from start to finish, in order to decode and correct the data. Accordingly, since each OPU beam will in general wait some time before it encounters the beginning of a new ECC frame, the theoretical benefit of multi-beam read-out cannot be realized with known DVD decoders. Of course, the above problems may be solved in the simple way of just replicating a single channel system N times then re-combining the data using software and a large data buffer, but this solution leads to multiple instances of large buffer memory, and in a 200 Hz (20× rotation speed system) will impose serious demands on the bandwidth of the buffer memories. A particular problem is that large quantities of memory and complex, high-performance logic circuitry cannot readily be provided together on a single low-cost IC.

OBJECT OF INVENTION

It is an object of the invention to provide improved methods and apparatus for read-out of data from digital storage media. It is a particular object of the invention to enable an efficient implementation of multiple read-out from a rotating storage medium, while decoding a 2-dimensional code such as that incorporated in DVD recordings.

SUMMARY OF INVENTION

The inventors have devised a range of architectures for a practical multi-beam DVD system (or a CD system), based on an understanding of the functions in the error correctors and by partitioning the memory into small, high-bandwidth blocks (suitable for integration) and larger, lower bandwidth blocks (allowing the use of standard commodity buffer RAM). These two types of memory blocks will be referred to herein as the "local" and "remote" memory, respectively. It is envisaged that the "remote" memory will typically form part of the user data buffer within the DVD drive, but external to the decoder IC itself, but the invention is not limited to such an arrangement. The remote memory might be external to the chip, but separate from the user data buffer, or it might form part of a block of compact, slower memory on a part of the IC, separate from high performance buffers.

The invention in a first aspect provides a method of reproducing data recorded in a first sequence, the data incorporating an error protection code applied on the basis of a predetermined size of data block, each error protection block comprising a series of several sub-blocks, the method comprising the following steps:

(a) Reading in parallel a set of N sub-sequences starting at N respective locations within said first sequence, said locations being chosen without restriction to said block or sub-block boundaries, the group of N sub-sequences encompassing a contiguous portion of the first sequence;

(b) During said reading step, identifying within each sub-sequence a series of sub-blocks forming a part of a data block and, in the absence of data from the start of the block, processing the series of sub-blocks in accordance with predetermined rules to accumulate a partial error protection syndrome relating to said block, (c) Upon reaching the end of said block, accumulating a syndrome for a next block within the sub-sequence;

(d) During said reading step subsequently identifying in another of said sub-sequences a series of sub-blocks forming a starting part of the block whose end part has been processed and processing said sub-blocks to accumulate the remainder of said syndrome;.

(e) Combining the remainder of said syndrome with the stored partial syndrome so as to obtain a complete syndrome for the block.

The method may further comprise (f) Jumping to a new set of locations in said first sequence and reading in parallel a further group of N sub-sequences to cover a further portion of the first sequence, said further portion being contiguous or overlapping with the preceding one, while step (d) includes identifying said starting part of the block among the further group of sub-sequences.

Said sub-blocks may be regarded as rows or groups of rows of a two-dimensional matrix, step (b) including performing an inner error correction on rows the matrix, while the syndrome accumulated in steps (c)–(e) is applied to columns of the matrix in a outer correction process.

The method may be performed using distinct local and remote storage for temporary storage of syndromes, said partial syndrome being accumulated in local storage in step (b); the accumulated partial syndrome being transferred to said remote storage in step (c).

Said transferring step (c) may be performed each time in association with said jumping step.

The partial syndromes may be combined during reading of the starting part of the block, said partial syndrome being transferred from the remote storage back to the local storage in step (d) for accumulation of the remainder of said syndrome in said local storage. Alternatively, said partial syndrome and the accumulated remainder may be combined away from said local storage.

The local storage may have space for approximately 2N syndromes. 3N−1 expensive syndrome buffers would be required to achieve the same processing without transferring the partial syndromes to cheaper storage during the rotation. The benefit of the invention can be seen in systems having fewer than 5N/2, or even fewer than 3N/2 syndrome buffers, depending on the memory bandwidth available. A system having 2N syndrome buffers is described below which combines the present invention with a syndrome double buffering technique.

The data recorded in said first sequence may comprise data recorded in a spiral on a disc-like record carrier, such as a DVD.

The invention in a second aspect provides a method of data retrieval in multi-track data read-out, the data comprising DVD data recorded on an optical disc, wherein partial error correction syndromes are calculated for parts of different ECC frames encountered by each beam, stored while other ECC frames are decoded and used as a basis for accumulating the complete syndrome.

In a preferred embodiment, the partial syndromes are stored remotely from the syndrome generator, and restored when the remainder of the respective ECC frame is encountered by a different beam, for use in accumulating the complete syndrome.

The invention further provides an apparatus for reproducing data stored on a record carrier, the apparatus comprising disc transport means including a pickup for reading data from the carrier, signal processing means for recovering data from the carrier and a decoder for decoding and error correcting the data read from the carrier, in accordance with error correcting codes included therein, wherein the pickup is adapted for reading multiple-channels in parallel to recover plural sub-sequences of a first sequence of data recorded on the carrier, and wherein the decoder is arranged to implement a method according to the first or second aspect of the invention as set forth above.

The invention yet further provides a decoder comprising input means for receiving in parallel plural sub-sequences of a first sequence of data to be decoded, and wherein the decoder is arranged to implement a method according to the first or second aspect of the invention as set forth above.

The decoder may comprise an integrated circuit including inner and outer correction error correctors, and buffers for the storage of at least one outer error correction syndrome per channel, and means for transferring a partial syndrome to external memory after encountering the end of a block of data.

BRIEF DESCRIPTION OF DRAWINGS

Embodiments of the invention will now be described, by way of example only, with reference to the accompanying drawings, in which:

FIG. 1 illustrates schematically the structure of a known single-beam reproducing apparatus for DVD;

FIG. 2 shows in block schematic form the process of decoding DVD data;

DETAILED DESCRIPTION

Figure 3:
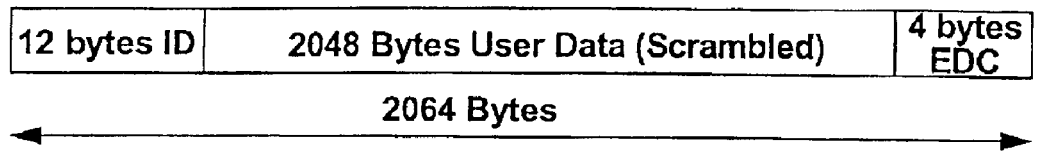
FIG. 3 illustrates a DVD data sector format.

Overview of DVD Reader Architecture and Error Correction Format

FIG. 1 shows the basic elements of an optical disc reproducing apparatus, in this case a DVD-ROM drive for use with a host computer, or part of a consumer DVD player for audio and video material. The key features are a transport mechanism 100 for the disc 102, an optical pick-up (OPU) 104 driven and focussed by various servo systems of known type, pre-amplifier 106, processing and buffering circuits 108, and an interface 110 to the computer, audio/video playback system, or other host. The present disclosure concerns primarily the processing and buffering circuits 108, and the other elements will not be described in any more detail.

FIG. 2 shows that the read data path of a DVD-ROM system is a complex structure consisting of bit detection 200, EFM+ demodulation 202, error correction 204 & 206, storage buffer 208 and host interface 110. Error correction is performed in two stages: inner error correction 204 and outer correction 206. Both types of error correction assume that a syndrome (or "signature") is generated (212/216 respectively) for a particular codeword. In the case of inner error correction, a codeword PI is given with a row of the recording sector, stored in a row buffer 210. Outer error correction is performed over the columns of the same sector using an outer codeword PO. The generated syndrome is then applied to an error correction module (214/218) that calculates the address and value of all correctable errors. Assuming that only correctable errors are present, the original data is recovered by applying the obtained corrections to the erroneous data. The outer correction process requires access to the buffer 208, which necessarily interrupts the flow of data arriving from the pick-up via the inner corrector. To absorb these interruptions without loss of data, a FIFO buffer 220 is provided at the output of row buffer 210. Having applied the corrections to the data, it is transferred via host interface 110 to the user.

In practice, the various elements 200–220 may be implemented by circuits dedicated to that function, or they may be implemented by a suitable combination of programmable hardware and software achieving the same function.

FIG. 3 illustrates the DVD data sector format for data stored on disc 102. Raw computer data is broken into 2048-byte sectors, as in CD-ROM. Each DVD data sector is 2064 bytes long and comprises 12 bytes Identification (ID), which contains Physical Sector address & ID, the data, and four bytes of error correction and detection codes EDC. Note that this is shorter than a CD-ROM sector (2352 bytes).

Figure 4:
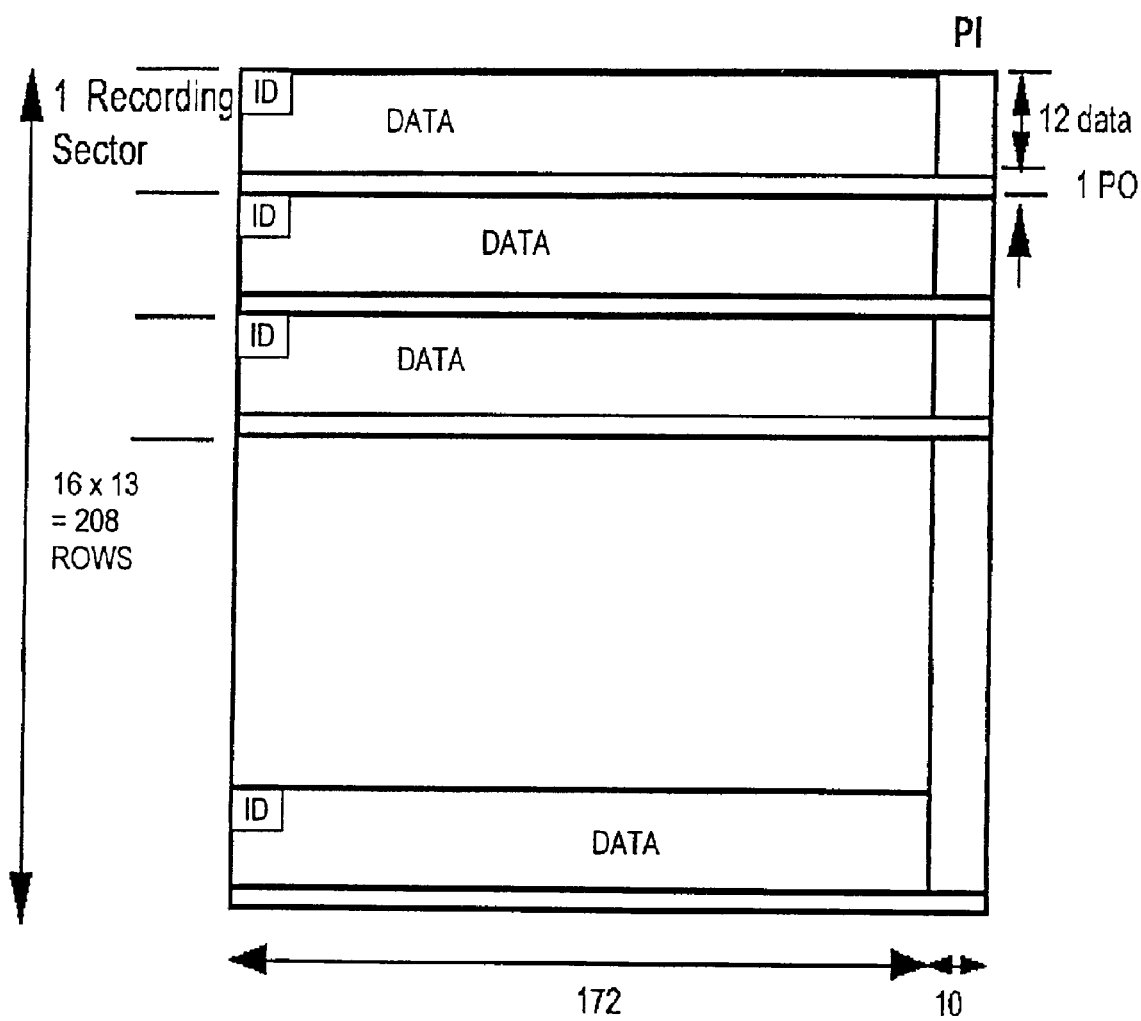
FIG. 4 illustrates the structure of an ECC frame in DVD, including 16 data sectors and error correcting code words.

FIG. 4 illustrates how 16 of the sectors shown in FIG. 3 are combined into a Recording Block or error-correcting code (ECC) frame using a RS (Reed-Solomon) Product Code. RS-PC is a block code, meaning that error correction (ERCO) operates over buffered blocks of data, these being the ECC frames. This is a more powerful (efficient) code than the CIRC plus 3rd level (C3) protection, employed in CD-ROM. Error Correction redundancy is approx. 13% (half that of CD). The ECC frame comprises 16×13=208 rows of 182 bytes of data within each row (not shown) data are encoded by EFM+ modulation, and two 32-bit sync codes (not shown) are inserted before the 0 and 91 byte positions in each row.

Each 2064-byte data sector occupies spread over 12 rows of the ECC frame, each row comprising 172 sector data bytes and 10 PI Bytes, which are the codewords (parity) added for the inner error correction. There are 16 Data Sectors in each ECC frame. After every 12 rows, a 13th row PO is added. The sixteen PO bytes in each column form a 16-byte outer protection codeword for reach column of the ECC block. The code operates over rows and columns of a data matrix giving a T=5 correction code over rows, and T=8 over columns.

The sync patterns inserted every 91 bytes vary, according to their position in the block. In particular, the first sync pattern in each recording sector, which is immediately followed by the ID field of the data sector, is unique within the ECC frame. In this way, the EFM+ decoder can readily identify the start of rows 0, 13, 26 . . . and every 13th row within the ECC frame, where the sector ID field is to be found.

It is found that the size of the buffers used in the data path represents a significant cost in a hardware implementation. DVD inner codewords correspond to a row of a DVD recording sector which consists of 172 data bytes plus 10 bytes parity check code. This implies that the row buffer 210 in FIG. 2 is at least 182 bytes long. In practice, this row buffer is used to store one codeword during syndrome generation, one codeword being error corrected and acts as buffer for the input and output data. Therefore, it may be assumed that an upper bound of the buffer size is 4 times 182 bytes or 728 bytes. In addition to the data buffer, some storage for the syndromes is needed which, in case of inner correction, equates to 10 bytes.

The DVD outer codewords correspond to the columns of the DVD recording sector and hence a much bigger amount of data must be considered. As there are 172 columns (length of a row) and 192 data rows in a recording sector, a buffer of 32 Kbytes size is required. Since it is expensive to integrate a buffer of this size into an IC, it is more efficient to calculate the syndromes while the data is being transferred into an external DRAM memory. This is possible as the correction process is only based on the syndrome and all corrections are applied in a read-modify-write operation to the external DRAM. This is indicated in FIG. 2 with the two input channels to the buffer, one for the data after inner correction and the other for the results of the outer correction.

Performing the error correction over the 172 columns of the recording sector implies that 172 syndromes of 16 bytes length must be stored, resulting in a storage requirement of 2752 bytes. Due to the fact that the data stream is still continuing while the calculated syndromes are applied to the error corrector, the FIFO buffer 220 is needed, with a typical capacity of 5 Kbytes (approximately 15% of the ECC frame).

Besides the buffers described above, there are also a number of computational blocks in the DVD-ROM Data path that contribute to the implementation cost. The most expensive block is the error corrector which typically has a gate count of well over 10,000 gates. The EFM+ demodulator (often realized as ROM lookup table) and syndrome generators are significantly smaller and each have a size less than 20% of the error corrector size. Therefore, the error corrector is often implemented as a shared resource in inner and outer error corrector.

Multi-Beam System

For a faster total data reading rate, a multi-beam system might be envisaged, as is known already in CD-ROM systems such as that of WO-A-98/37555 mentioned above. In a simplistic approach to a multi-beam decoder (not illustrated) the entire data path of FIG. 2 can be replicated N times for an N Beam system, the data from these N channels being recombined in a large RAM buffer. The chief disadvantage of this approach is that the error correction logic is replicated N times and the ERCO buffer (32 kByte) and the Syndrome RAMS (2k7 byte) are replicated N times, which makes for a very expensive one-chip decoder.

Figure 5:
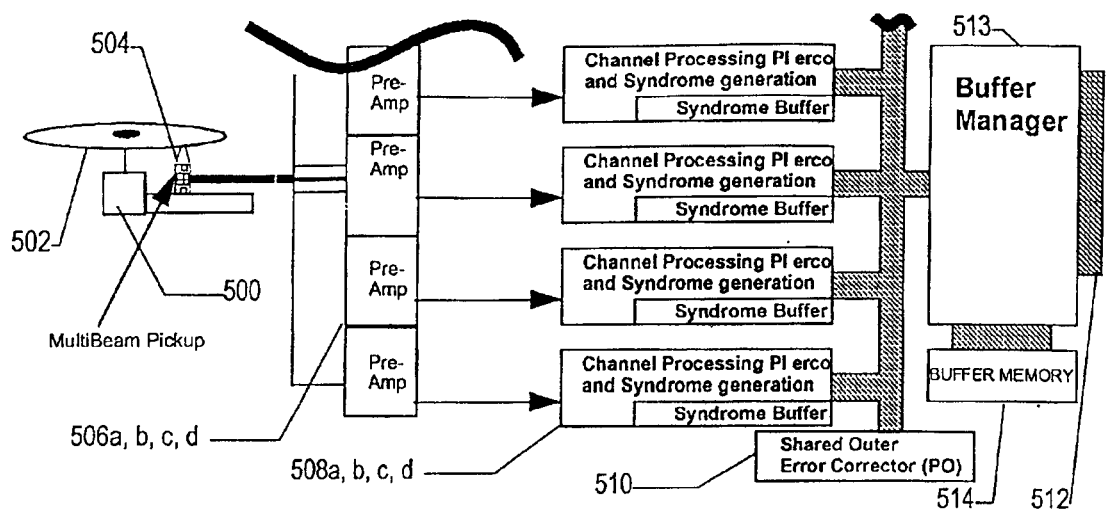
FIG. 5 illustrates schematically the general structure of a multi-beam DVD reproducing apparatus.
Figure 6:
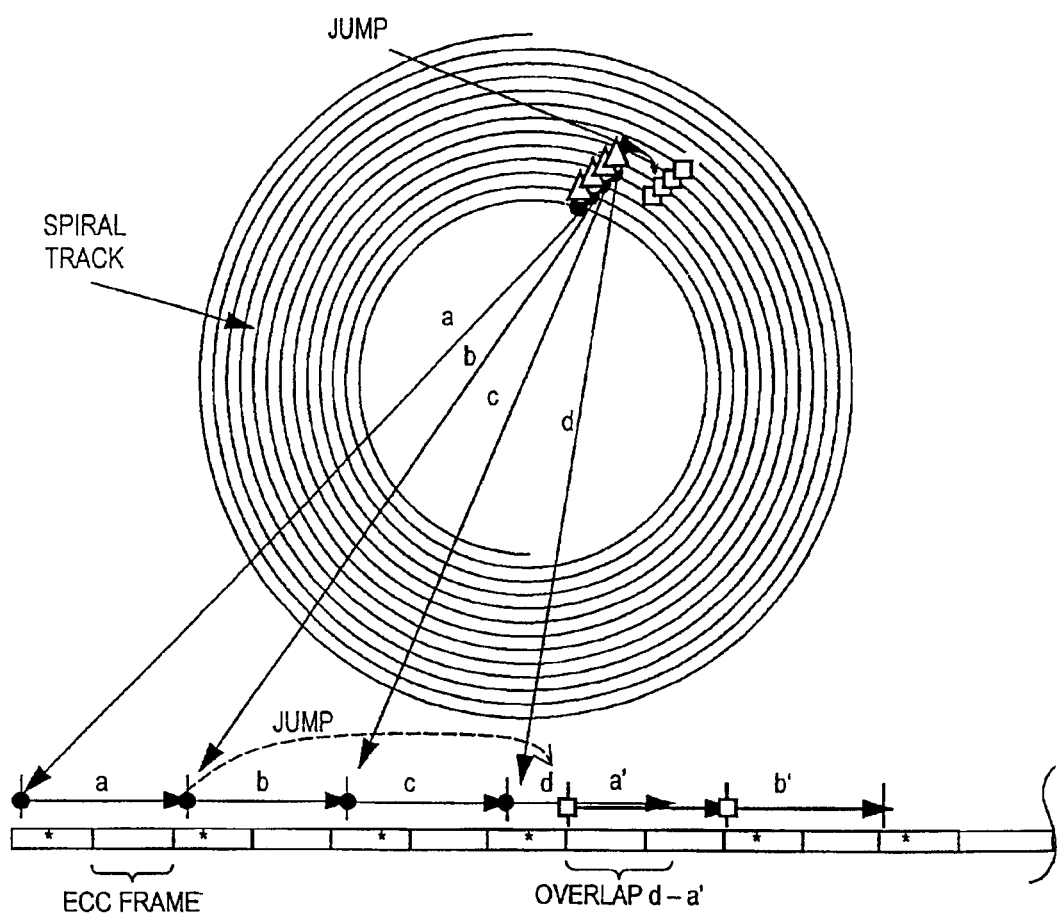
FIG. 6 illustrates the process of multi-beam read-out from an optical disc in DVD.

FIG. 5 illustrates a more sophisticated multi-beam system, and one in which the syndrome double buffering and partial syndrome calculation mentioned in the introduction can be applied to advantage. A conventional (or high-spin speed) DVD disc transport 500 and disc 502 are supplemented with a multi-beam OPU 504 having N beams, and outputting read-out signals in N parallel channels. N=7 will be a typical figure in the embodiments which follow, although only four channels are shown in FIGS. 5 and 6, for clarity. Separate pre-amp stages 506a, b, c, d are provided, one per channel, and similarly channel processing up to and including inner ERCO processing is performed in parallel by circuits 508a, b, c, d.

By suitable control of the memory interface in buffer management block 513, the main ERCO buffer can be placed into the external SDRAM 514, and parts of the error corrector may be shared between the channels. The extended functions of the buffer manager, compared with that of a singlebeam system, will be described later in relation to FIG. 10. In the arrangement of FIG. 5, the inner corrector is conventional, and the outer syndrome generation (very high memory bandwidth) is on-chip, while the main buffers are off-chip in memory 514. A shared outer corrector 510 is used. These features will be exemplified in more detail with respect to the later Figures. Depending on the performance of the outer ERCO circuit, alternatively, a number of parallel outer correctors may be used to increase performance. A variety of designs can be made by adjusting these parameters to trade performance against complexity and power consumption.

FIG. 6 illustrates the process of multi-beam read-out on an (exaggerated) spiral track of a DVD or CD. Channels a, b, c, and d are related to beam spots which follow four adjacent tracks on the disc. Beam a is the innermost of the four, and beam d is the outermost. In the diagram, it is represented that the beams move around and outward over the disc surface. In reality, of course, the disc rotates while the OPU stays at the same angular position, but tracks radially outward. While the adjacent points can be regarded as four parallel tracks, it must be remembered that they are in fact simply points on one continuous spiral, so that, after one revolution, beam a reaches the position where beam b started, and so forth. The single linear sequence of data laid down in the spiral track is represented at the foot of FIG. 6, with ECC frame boundaries being represented.

Black circles show the beam positions at the start of a first revolution. The corresponding positions within the data are shown on the linear representation at the foot of the figure. Triangles show the positions of the beams after one revolution. Squares show beam positions a', b' etc. after one revolution and a jump. It will be seen that data is lost due to jump latency until a complete disc rotation has finished. For this reason, the maximum jump is effectively N−1 tracks, and channel a takes over at a point a' part way through the portion most recently covered read be channel d.

It is noted that, in general, read-out after a jump will begin part-way through an ECC frame. ECC frames marked with an asterisk "*" in FIG. 6 are only partially read by any one beam and this results in partial or out of order data arriving at the outer syndrome generators. This is not such a problem in CD-ROM systems, where the error correcting code is linear, and valid data can be decoded a short time after jumping to a new track location. In DVD however, decoding requires a complete ECC frame before valid data is obtained out of the inner and outer ERCO processes. At the innermost track radius, there are only 1.6 or so ECC frames per rotation, so that almost two-thirds of a rotation time may pass before even the start of a new ECC frame is encountered by a given beam, and the decoder can find out where the data which is being read belongs in the linear sequence. On the face of it, therefore, the benefits of multi-beam read-out which are familiar in CD systems cannot be realized in the block-coded structure of the DVD data stream.

The inventors have recognized, however, that sector IDs may be extracted from the inner corrector buffer, sixteen times per ECC frame, by which the data may be correctly located into the external buffer memory. The linear track length which must be passed before a sector ID is found is only around 4 mm, so that the latency after jumping to a new track is only a small fraction of the rotation period. Furthermore, it is recognized that, once the location within an ECC frame is known, partial syndrome generation can be performed using the outer parity codewords (PO) which are interleaved with the user data in the recording sectors. As is known in the Reed-Solomon code, syndrome generation essentially comprises multiplication of each received row by a predetermined polynomial function, the polynomial function ("alpha") being raised to a power each time, dependent on the position of the data within the block. As soon as a sector start is identified, the decoder thus preloads the syndrome alpha-power multipliers to be consistent with the position in the frame, which is known from the sector ID. This can be simply done from a lookup table, as only 16 start positions are possible (based on there being only 16 rows identifiable by sector ID field, in the ECC frame).

In this case, at the end of the individual ECC frames, marked with "*" in FIG. 6, only a partial syndrome will have been created, and the rest of the data for that frame will not be available until the disc rotation is complete. Within one rotation, for example, the start of channel b's incomplete frame is found in channel a, and so forth. In the meantime all the intervening ECC frames require decoding.

Here, it is important to realize that one part of a partial syndrome is generated at the beginning of a disc rotation (for example at a' just after a jump) whilst the remaining information becomes available at the end of a disc rotation (b). This means that the partial syndrome must be stored for an entire disc rotation. The Syndrome RAM (approximately 2.7 Kbytes per ECC frame) is a precious resource as it has to operate at very high bandwidth. 16 Read-Modify-Write Cycles are necessary for each channel byte received. To make best use of the available on-chip Syndrome RAM, the apparatus disclosed herein the Syndrome buffers are allocated dynamically per channel (per beam) and buffers containing partial results are dumped into a cache area in the main stream buffer (memory 514 in FIG. 5). The Cached data may be retrieved after one disc rotation when the start of the partially recovered ECC frame is again detected. The FIFO buffer between the inner and outer ERCO circuits is eliminated by use of the double-buffering of syndromes, which is explained more fully in our copending application mentioned above [498224]. Further expansion/description of the method is given below, in relation to several alternative embodiments.

Detailed Examples of Multi-Track DVD-ROM Systems

As explained above, in order to reduce spin speeds while still maintaining or increasing performance and throughput, data is read from several parallel tracks in the proposed multi-track DVD-ROM systems. Different architectures can be envisaged, however, depending on the point in the data path (FIG. 2) at which the data that is received from the N parallel input channels is recombined into a single data stream. Obviously, the location of this recombination block has a significant impact on cost and performance of the resulting system. In a first detailed embodiment, recombination will be performed just after bit detection or EFM+ demodulation, resulting in a system where the main decoding electronics remain virtually unchanged from a single spot system. Other solutions for higher throughput rates and added flexibility will also be described, however, which move the recombination after the inner or outer error corrector, allowing more detailed trade-offs between maximum performance and system cost.

Depending on how the place of the recombination, the following architectural options are considered herein:
  recombination after bit detection or EFM demodulation.
    using a multiplexer and a modified handling of outer syndrome generation.
  recombination after error correction and before the main buffer manager
    simple duplication of data path logic results in a system that is ECC frame-based—this is inefficient due to the time spent after each jump, waiting for the start of an ECC frame, and will not be illustrated in detail.
    outer syndrome generation is performed across input channels such that alignment to EDC frames (sectors) is possible recombination after inner and before outer error correction
      using a buffer for partly corrected data
      using a multiplexer and modified syndrome generation All of the above alternatives are discussed in the following sections. The most obvious of the above mentioned approaches is stream recombination just after bit detection or EFM+ demodulation and is considered in relation to the first embodiment of FIGS. 7 to 10. The second detailed embodiment (FIG. 11) applies stream recombination after error correction. The third embodiment (FIG. 12) applies stream recombination in between inner and outer error corrector. The caching and retrieval of partial syndromes can be applied in all of these, to reduce syndrome buffering requirements, by moving partial syndromes to cheaper memory locations when not immediately required.

The functional blocks of the standard DVD decoding process (FIG. 2) will be recognized in these embodiments. The differences arise naturally in the number of instances of each block, where parallelism comes into play, and in the additional configurability and control logic for the handling of recombination of streams and partial data.

For the purposes of illustration, the following practical examples are based on the following assumptions:
  Expected user data rate: 64×DVD Oust under 90 MByte/sec).
  N=7 channel multi-track system.
  Data recombination based on EDC frames.
  System efficiency after jumping and data synchronization has been taken into account: 80%.
  Required performance in each input channel: 11.5×DVD, individual channel data rate=nearly 38 MByte/sec.

First Example-Recombination before Error Correction

FIG. 7(a) shows the block diagram of a system with buffer-less recombination where a multiplexer 720 is used to transfer the incoming data bytes into the EFM+ decoder. Alternative arrangement (b), of which the front end only is shown, has a separate EFM+ demodulator for each channel, and the multiplexer feeds into the row buffer of the inner error corrector section. The operation of the two variants embodiments is similar. However, the volume of data passing through the multiplexer will be much less in case (b). The detailed structure and control of the row buffer and the Inner ERCO section is described below with reference to FIG. 8. A dynamic syndrome buffer 722 is provided, in association with the outer ERCO circuitry, as will be described in more detail, with reference to FIG. 9.

As mentioned in the general discussion of the DVD data format, the EFM+ sync words which are inserted every 91 bytes allow the EFM+ decoders to identify the boundaries of rows and sectors in the ECC frame structure. The designers of the present apparatus have recognized that this valuable information is in fact available at an early stage in the data path. This allows data, particularly partial data, to be directed immediately to suitable buffer locations, rather than being held "in limbo" pending a deeper decoding of the sectors themselves. The various flags which are generated by the EFM+ demodulator to identify row and sector boundaries are shown as outputs of the multiplexer in FIG. 7(b):
  data[31:0], four data bytes at a time,
  data_valid, indicating whether valid data is present,
  pi_row_start, indicating that a new PI codeword starts,
  edc_start, indicating the start of a new ECC recording sector and
  channel_nr, indicating from which input channel the current data originates.

These are used in the error correction circuits of FIG. 8, to be described in more detail below.

Before discussing FIGS. 8 to 10 in detail, the operation of this arrangement will be described in outline. Once an entire row containing a PI-codeword has been transferred into the row buffer, the syndrome is generated and applied to the error correction module. Once all corrections have been made in the row buffer, the codeword can be handed over to the outer error corrector. Note that the results of the inner error correction process are useful as "hints" to the outer process. For example, the inner syndromes may reveal erasure of the entire row of data. This information can be used, in addition to the outer codewords PO, to locate errors within the columns, which assists the outer ERCO process.

This approach requires a inner row buffer of the following size: N buffers of 182 bytes to accommodate incoming PI codewords, (N−1) buffers waiting for processing, 1 buffer used during inner syndrome generation, 1 buffer used in the inner error correction process and 1 buffer for the data transfer to the outer error corrector. This is in total (2N+2) buffers. With N=7, 16 buffers of 182 bytes are needed, resulting in a storage requirement of 2912 bytes. In addition to the physical storage space, the row buffer must also contain logic that controls the input multiplexer, generates addresses for the physical buffer and identifies completed rows which are complete and ready for correction. Furthermore, the control logic must ensure that corrections are written back to the correct buffer, fully corrected data is transferred to the outer error corrector and that unused buffer space is reallocated to the input buffering process.

The buffer-less implementation of the stream recombination implies that outer parity codewords PO from N different recording sectors are presented to the outer corrector, thus resulting in the simultaneous generation of N syndromes. Therefore, additional control logic is needed to associate incoming data with a particular syndrome buffer and, when a particular syndrome has been completed, hand it over to the error corrector. Also, the control logic must ensure that the corrections are written to the correct address in the user data buffer.

With respect to the storage requirements, it is apparent that the syndrome buffer must store the N syndromes that are currently being calculated, N−1 syndromes that are awaiting corrections and 1 syndrome used in the current error correction process. Furthermore, it can be seen that before and after a jump only parts of an ECC sector are transferred via an input channel. This means that after a jump has been completed, up to N−1 partially calculated syndromes are calculated for ECC sectors whose first rows have been missed. The missing rows are read off the disc by a neighboring input channel at the end of a disc rotation. The corresponding partial syndromes could be stored in the syndrome buffer 722. However, in order to minimize the size of this on-chip buffer, they are in the novel system stored in the off-chip user data buffer 724. If all syndromes were stored locally, 3N−1 syndrome buffers are needed, resulting in a total buffer size of 55040 bytes.

When partial syndromes are stored in external memory, the amount of syndrome buffers reduces to 2N. If also the N−1 syndromes awaiting correction are stored in external memory, there will be only N+1 buffers. In low performance systems, it may be possible to store N−1 of the syndromes in generation in external memory thus reducing the number of buffers to 2. Note that the described method of syndrome calculation requires that all incoming data bytes are pre-multiplied with the correct alpha value. Note also, that the size of the external user data buffer is determined by twice the amount of data on a disc rotation which is around 2 MByte. This is because the corrected data is placed into the buffer in a non-linear way and only after a full disc rotation it is possible to obtain a serial data stream.

Based on the assumptions given above, after EFM demodulation, the data rate in each of the channels is about 18 MByte/sec which equates to an overall transfer rate over 120 MByte/sec. To cope with this high data rate, it is suggested to increase the bus width such that a lower clock frequency is obtained. A bus width of 32-bit is suitable here. A clock frequency of 75 MHz is more than efficient to accept the data bytes from the individual channels, group them into a 32-bit word and multiplex them out of the stream recombination block.

Buffering of PI Codewords and Inner Error Correction

Figure 8:
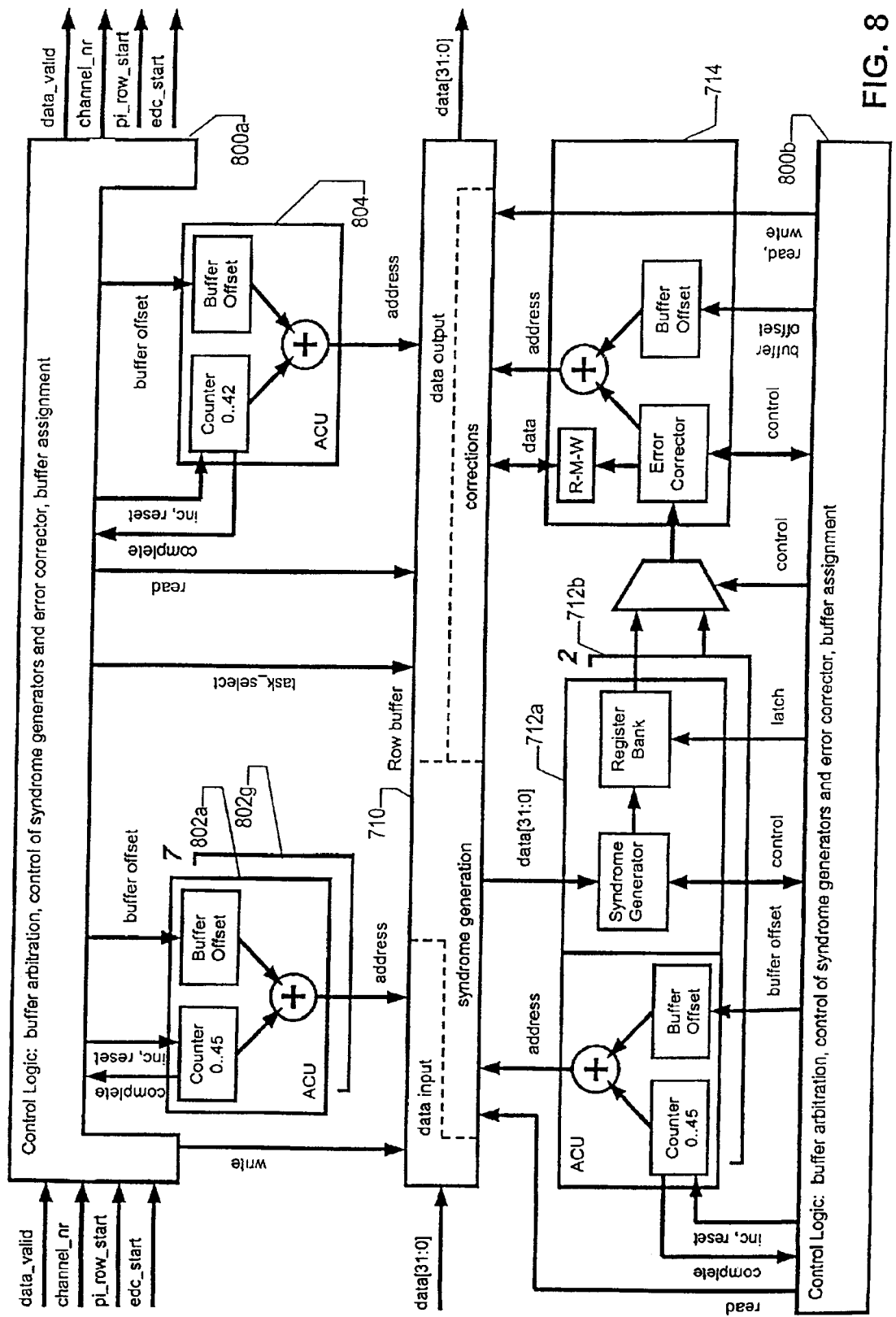
FIG. 8 shows in more detail a row buffer and inner error corrector in the circuit of FIG. 7.

Referring now to FIG. 8, the central element in the inner correction section is the row buffer 710 as it is used to reconstruct the data coming in from EFM demodulation into PI-codewords, identify completed codewords and initiate syndrome generation, hand syndromes over to the error corrector and ensure that corrections are written back into the row buffer. Furthermore, the data after inner correction must be transferred to the outer error correction section. The row buffer 710 is notionally divided, as shown by dotted boundaries in FIG. 8, according to these functions.

Of particular importance is the bandwidth of the row buffer. This is because four independent tasks read and write data out of the memory at a high rate. The combined data rate is determined by:

Buffering of incoming data into the row buffer:
Data transfer into syndrome generator:
Correction of errors: read-modify write operation
Data transfer to outer error correction section:

Under the assumption that the memory is 32-bit wide and that each byte of the error corrector accesses must be translated into 32-bit accesses, a total required bandwidth of over 100 MWord/sec is obtained. This could be implemented as a memory subsystem that is clocked at twice the system frequency, or as two interleaved memory instances. Alternatively, dual ported memory could be used to facilitate the required write rate of 36 MWord/sec and read rate of 66 MWord/sec.

Besides the row buffer, also syndrome generation and error correction module require high data throughputs. The requirements for the syndrome generator are given with the PI-codeword rate which is given with 11.5×DVD time 7 channels, which yields over 700000 codewords per second. IN order to reduce the clock frequency to a sensible figure, two syndrome generators 712*a* and 712*b* (corresponding generally to syndrome generator 712 of FIG. 7) work in parallel at an operating frequency of 75 MHz. This clock frequency is also a good choice for the error correction module which operates approximately twice as fast as the syndrome generator. Hence a single instance is sufficient.

The four tasks of the row buffering and inner correction section are now described into more detail: All four tasks need access to the row buffer 710. Control logic 80*a* and 800*b* is provided to control the operations of buffer arbitration, control of syndrome generators and error corrector, buffer assignment. The flags output by the multiplexer 721 in FIG. 7(*b*) are inputs to the control logic. Bandwidth is assigned in a fixed priority scheme where each of the tasks is serviced in a pre-defined order, for example a round-robin scheme. For the explanation of the four tasks, refer to the diagram in FIG. 8:

1. Store the incoming data into the row buffer such that incoming data quadlets are stored together with other data of the same Pi codeword. To achieve this:
   The control logic monitors the data input and waits for the data_valid signal.
   The channel_nr is used to generate the task_select signal.
   Each of the N=7 input channels has a dedicated address calculation unit (ACU) 802*a–g* that is used to generate a buffer address. The buffer offset is programmed by the control logic 800*a* at the start of a new PI codeword. A counter is incremented after a data item has been transferred.

2. Read completed PI codewords out of the buffer and generate a syndrome. To cope with the throughput requirement of 64×DVD, two syndrome generator sections 712*a*, 712*b* are present:
   The control logic maintains a list of completed PI codewords together with the base address in the buffer.
   The list of completed codewords is processed in a first-in-first-out order.
   The base address is transferred to the syndrome generator ACU and the counter is enabled.
   This transfers data bytes in an alternating fashion to one of the two syndrome generators.
   Syndromes bytes generated in the syndrome generator are stored in a register bank until the error corrector becomes available.

3. Ensure that corrections are written to the correct locations:
   Syndromes from one of the two syndrome generators are transferred to the error corrector 714.
   For each error in the codeword, an error address and magnitude is obtained. To calculate the address in the row buffer, a buffer offset is added that has been programmed by the control logic at the time error correction was initiated.
   Data is read out of the row buffer, an XOR operation is performed with the error corrector output and the data is written back into the row buffer (read-modify-write cycle R-M-W).

4. Read data out of the buffer once inner error correction has been completed and transfer it to the outer error corrector section:
   Once the error corrector has finished the correction of a codeword, it is transferred to the outer error corrector section (716, 718, FIG. 9).

To read the data from the right location, a buffer offset is programmed by the control logic while a running count is generated inside ACU 804.

Outer Syndrome Handling and Error Correction

Figure 9:
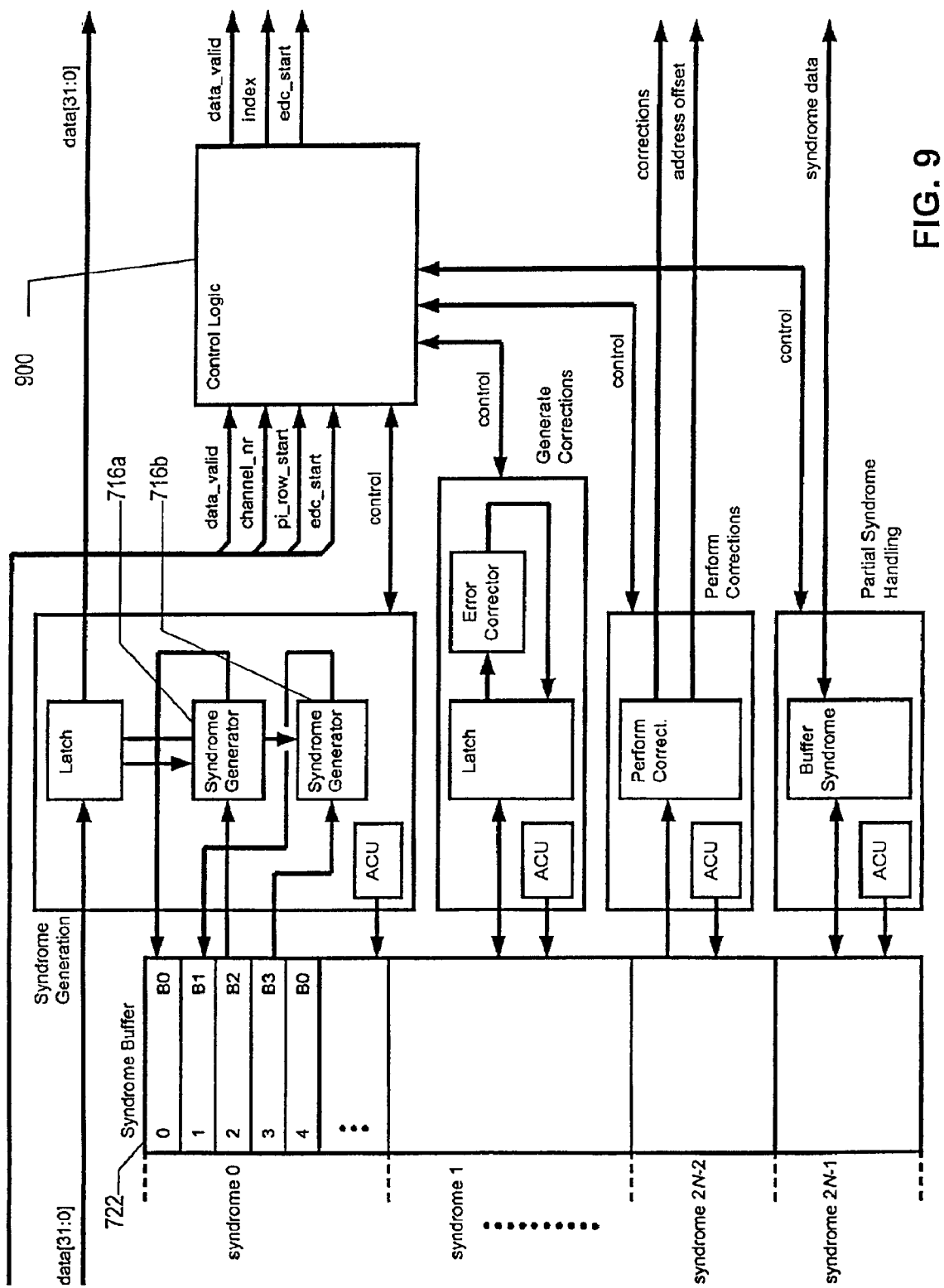
FIG. 9 shows in more detail an outer error corrector in the circuit of FIG. 7.

FIG. 9 shows the Outer Syndrome Handling and Error Correction 716, 718, 722 in more detail. As with current error correctors, syndrome generation for the PO codewords is a problem due to the high bandwidth requirements. For each data byte that is transferred into the outer error correction section, 16 syndrome bytes must be read, updated and written back into the memory. This problem is further complicated by the fact that four data bytes are received at a time, at a rate of 30 MWords/sec from the inner correction section. To overcome the problem associated with the high throughput it is suggested to use two syndrome generators 716a, 716b running at 75 MHz. Pipelined construction of the module allows a 16-byte syndrome and a data item to be processed every clock cycle. The two combined generators provide then a processing capability of 150 MByte/sec.

Sufficient memory bandwidth for the two syndrome generators is provided through the use of 4 interleaved memory banks B0–B3 within the syndrome buffer 722. Two memory banks are used to read syndromes for the two syndrome generators, and the remaining two banks are employed to store the two modified syndromes related to a previous data item. This leads to a memory configuration of 128-bit (16-byte) arranged in four banks. (Note that if the memory were operated at twice the system frequency (150 MHz), the bank count could be reduced to two.)

When four memory banks are used, the access rate to each individual bank is determined by the fact that 120 MByte of data are transferred per second. As already described, two simultaneous reads are performed from two different memory banks, thus resulting in an single bank access rate that is half the incoming data rate: 60 MByte/sec or 63 million accesses.

So far it has been shown that the N=7 syndrome buffer 722 provides sufficient memory bandwidth for the actual generation of the syndromes. Here it is investigated whether it is possible to cache all of the syndromes in external memory. If this were possible, only N=7 syndrome buffers will be needed. The first issue in syndrome caching is the bandwidth required for the retrieval of completed syndromes out of the buffer. Assuming a clock frequency of 75 MHz and an access rate of 63 MHz, it is apparent that 85% of the bandwidth is used, 15% is still available. It can be shown that in situations where more than two ECC frames are completed at the same time, there is not sufficient time to copy a syndrome from the syndrome buffer into a different location: an available bandwidth of approximately 35% is needed.

Of course, memory bandwidth can always be increased to suit, but at cost. In the present embodiment, syndrome double buffering is used in addition to caching of partial syndromes. Double buffering of syndromes means that two syndrome buffers are used for each channel, one buffer being used for the generation of a syndrome set, the other containing completed syndromes before they are applied to the error corrector. Once a syndrome has been transferred to the error corrector, it is subsequently replaced with the error magnitude and location obtained from the error corrector. Syndrome double buffering is claimed in our co-pending application [ID 498224], mentioned above.

In the previous paragraph it has been proposed that double buffering may be used, thus increasing the amount of buffers to 2 N. As already explained, syndromes are read out of the buffer and correction information is written back. The required additional bandwidth can be calculated, and leads to the conclusion that the syndrome buffer with double buffering has sufficient bandwidth for syndrome generation and error correction. Due to the fact that there are N=7 input channels, a situation may occur where the syndromes of 7 ECC recording sectors are completed at the same time. This implies that all 7 sectors must be corrected before the next syndrome is completed. Again, it can be calculated that there are more than sufficient clock cycle available for the correction of the 7 ECC frames.

In the discussion of FIGS. 5 and 6 above, it was outlined that the efficient multi-track systems proposed herein work on a sector (EDC) basis. This is important since each time a jump is performed, it is quite unlikely that the retrieved data lines up with an ECC frame. Instead data transfer starts with EDC sector n and ends with the last frame 15 before data from the following ECC frame is processed. The remaining frames 0 . . . n−1 of the first ECC frame sector are received at the end of a disc rotation from the neighbor channel. This implies that potentially N−1 partial syndromes are generated after a jump (the first channel is either aligned to an ECC frame or starts data processing only towards the end of a disc rotation). Since these partial syndromes cannot be used for error correction, they need not occupy expensive buffer space and can be transferred into external memory.

As explained above, there are two buffers per channel: one for the calculation of the current syndrome and one syndrome used in the correction process. To free the space occupied by a partial syndrome it must be transferred during the time it takes to calculate the next syndrome into external memory. Reading the syndrome requires 172 buffer accesses compared to 12896 possible memory accesses, which means that the transfer is uncritical. Note that bandwidth into external memory is not an issue as the presence of partially corrected syndromes means that the error corrector is not running and hence there is no bandwidth required for corrections. At the time the missing part of the partial syndrome has been generated, it must be combined with the first part that has been stored in external memory. This requires to read the partial syndrome out of the external memory, combine it with the partial syndrome retrieved from the external memory and write it back into the syndrome buffer. At this point in time, error correction can be initiated. Memory bandwidth from external memory and into the syndrome buffer should not be a problem, because the described handling of syndromes is only required at the end of a disc rotation, just before a jump is initiated. Note that the described partial syndrome handling requires a pre-multiplication of the initially generated syndrome with alpha raised to a power depending on the number of the first EDC sector. This can be done before the data is written into the external memory.

The block diagram in FIG. 9 shows again the four tasks that are present in the outer correction section:

1. For each incoming data byte, a 16-byte syndrome must be updated:

Each incoming data quadlet is stored in a latch, two data bytes are utilized in the first available clock cycle, the two remaining bytes in the following.

Two syndromes are read, for example, out of banks B2 and B3. At the same time, two syndrome generators update the syndromes assigned to the previous data byte while the results from the preceding cycle are stored in banks B0 and B1.

Concurrently, the data bytes are transferred into the buffer manager. This requires that the control logic provides an index signal that is used to write the data bytes into the correct memory location.

2. Error correction information is calculated from the syndromes:

A list of completed syndrome sets is maintained in the control logic.

The 172 syndromes of a syndrome set are transferred to the error corrector and once the error correction information is obtained it is transferred back into the syndrome buffer. (In FIG. 9 this is illustrated as happening for Syndrome 1, although the address of the syndrome will of course vary.)

3. Correction information is written into the external memory:

Once all 172 sets of correction information have been obtained from the error corrector, the error magnitude and address is transferred to the buffer manager. (This is shown happening for syndrome 2N−2 in FIG. 9, by way of example only.)

Control logic 900 generates an index signal that indicates to which ECC sector the corrections belong.

4. Cache partial syndromes in external memory:

Each time a partial syndrome set has been generated, the 172 syndromes are read out of the syndrome buffer and transferred into external memory. (Shown happening to Syndrome 2N−1 in FIG. 9.) During the transfer, the multiplication with the correct alpha value is performed (transfer into external memory is not time-critical).

This requires the control logic to generate an address for the buffer manager.

The control logic monitors the IDs of incoming ECC sectors and once a sector is found that corresponds to a partial syndrome set, syndrome calculation is performed until it contains the information from the EDC frames that is not contained in the partial syndromes that is cached in external memory.

The first partial syndrome is retrieved from external memory and combined with the second partial syndrome in the syndrome buffer. This requires a read-modify-write operation.

Buffer Manager

Figure 10:
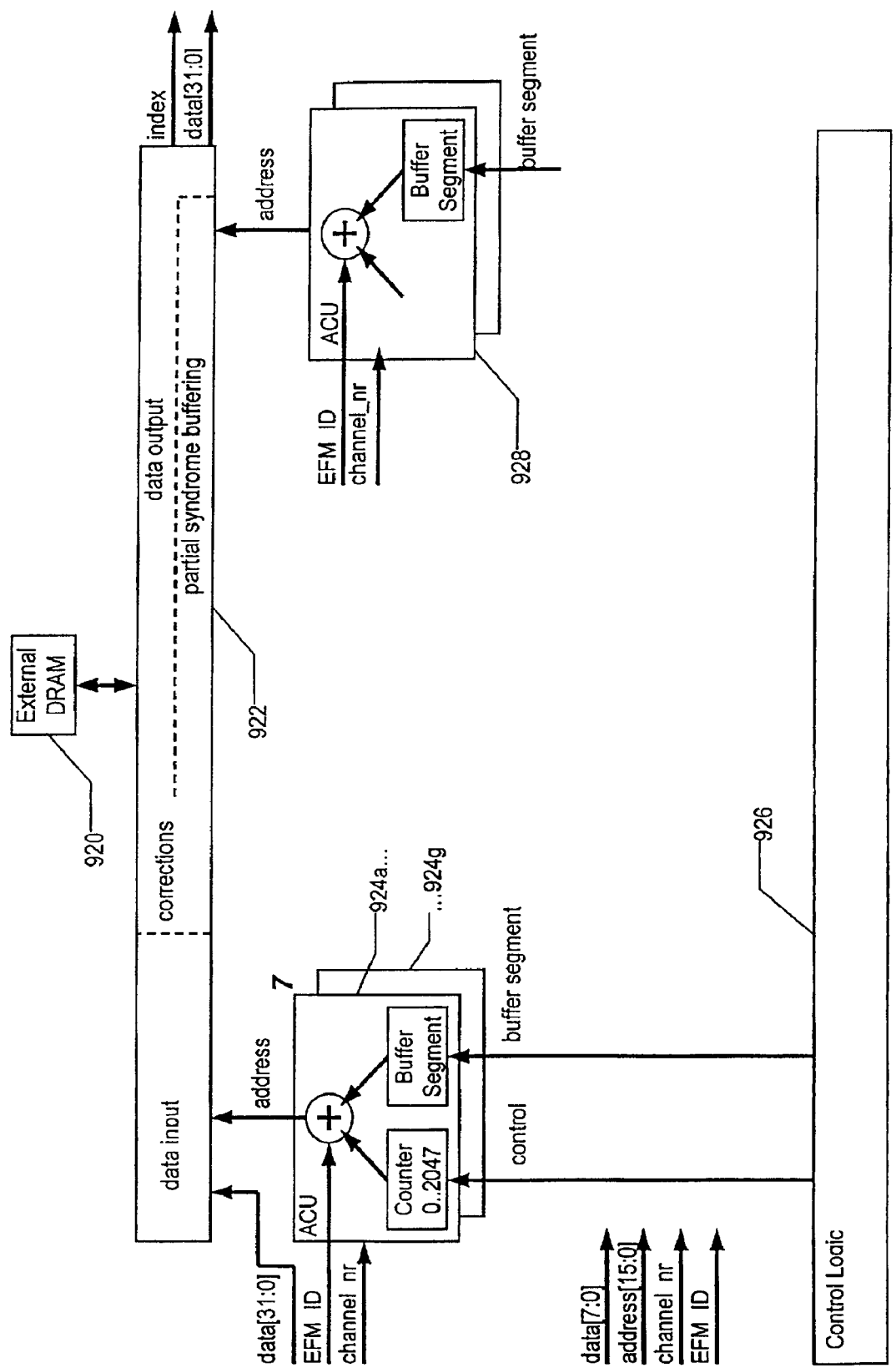
FIG. 10 shows in more detail an external memory interface in the circuit of FIG. 7.

FIG. 10 shows in more detail the buffer manager (corresponding to block 513 in FIG. 5) that receives the data and the outer corrections coming from the DVD error corrector (FIG. 9) and stores them in the external DRAM 920 or other memory. Interface logic 922 manages the addressing and transfer of input data being read from the disc, corrections, partial syndromes and output data being retrieved and streamed out via the host interface (512 in FIG. 5).

Although in a multi-track system the buffer manager maintains only one data input and one correction input channel, there is still a significant difference to a single channel system. This is because in a multi-track system the data transferred at any one time originates from N=7 different ECC recording sectors. Hence, the buffer manager must contain N address calculation units (ACUs) 924a–g that generate the addresses for the external DRAM. The association of an incoming data item to a particular ACU is done via an index signal that is provided by the outer error correction section (FIG. 9). Address generation inside an ACU is be based on a running index, related to the number of incoming bytes, a part that is related to the EDC ID number, and a part that is programmable by the control CPU. In this way, it can be arranged that the data between two jumps is retrieved and sorted into the external memory without further CPU interaction.

As explained already with reference to FIG. 6, a jump of N−1 tracks is required once the data of a disc revolution has been read. To establish the right jump time, the apparatus monitors whether all EDC frames that are present on the corresponding disc tracks have been retrieved without error and stored in the DRAM. To this end, the buffer manager in the present embodiment has the following specific functionality (alternative arrangements are of course possible), provided by control logic 926.

Each EDC frame is represented by a single bit (or by a set of bits) in a small register file. These bits indicate the status of each EDC frame including: not received, in transfer, data and corrections received, unrecoverable error. Using simple logical operations it is then possible to know at any given time whether a consecutive set of EDC frames has been received without error, and therefore a jump should be performed. Jumping is initiated by interrupt to a controlling CPU, which may be on the same IC as the decoder. Similarly, an interrupt should be generated when some EDC frames are erroneous. In this case, of course, the jump should be delayed such that the EDC frames in question are read again on the following disc revolution, this time by a different input channel.

In addition to the above mentioned functions, the buffer manager requires also an additional channel with ACUs 928 for the caching of partial syndromes. This channel is used only for burst transfers and should have higher priority than other channels. This is because the corresponding data must be read from and written to the outer syndrome buffer which has only limited bandwidth available.

The bandwidth requirements to the external memory is determined in the described 64× system by the rate at which data is retrieved from the channel side, the number of outer corrections and the host interface bandwidth. As described earlier in this chapter, the data rate from the error corrector is 120 MByte/sec. This should, on average, also be the host interface data rate. In addition, a bandwidth of about 3.5 MByte/sec is required for the caching of partial syndromes (assuming a 11.5× spin speed, around 110 jumps are performed per second, and after each jump 6 partial syndromes of 16 times 172 bytes must be read and written). Furthermore, around 70 MByte/sec are needed for the read-modify-write needed to write the corrections into the external memory (3567 ECC sectors per second with a maximum of 172×8 corrections, each needing around 15 clock cycles). This is in total a bandwidth requirement of 315 MByte/sec.

Concluding the description of the first embodiment, we see that the advantages of this implementation include:

No large input buffer is required for the stitching together of raw data.

Full performance of external memory interface available for user data.

Area and power efficiency (utilizes existing decoder architecture that requires a 50 MHz clock to achieve 32×DVD performance).

Works on EDC frame granularity (if that more complex scheme for address generation and data checking is acceptable, it is possible that even PI-codeword or EFM frame granularity is achievable).

Blocks for bit detection, EFM demodulation, inner and outer syndrome generation, error correction and host interface can be reused without problems.

Some new circuit blocks are required, relative to conventional singletrack hardware:

Row buffer control logic that is capable of generating addresses for the N input data streams and is able to identify when a row has been completed and syndrome generation as well as error correction must be initiated.

Control logic in the outer error correction section that maintains a set of syndrome buffers and assigns those to the input channels. This logic also needs to identify which syndromes are complete and available for error correction. Furthermore, addresses or address indices for the user data buffer (data and corrections) must be generated.

Buffer manager needs additional input that is used in the address generation for user data and corrections. It must be possible that the control logic in the outer error corrector section generates an address or address index that allows to associate the current user data or corrections with the memory segment that is allocated to a particular EDC or ECC frame. Additional address calculation units (ACUs) may be needed, depending on system implementation.

Figure 11:
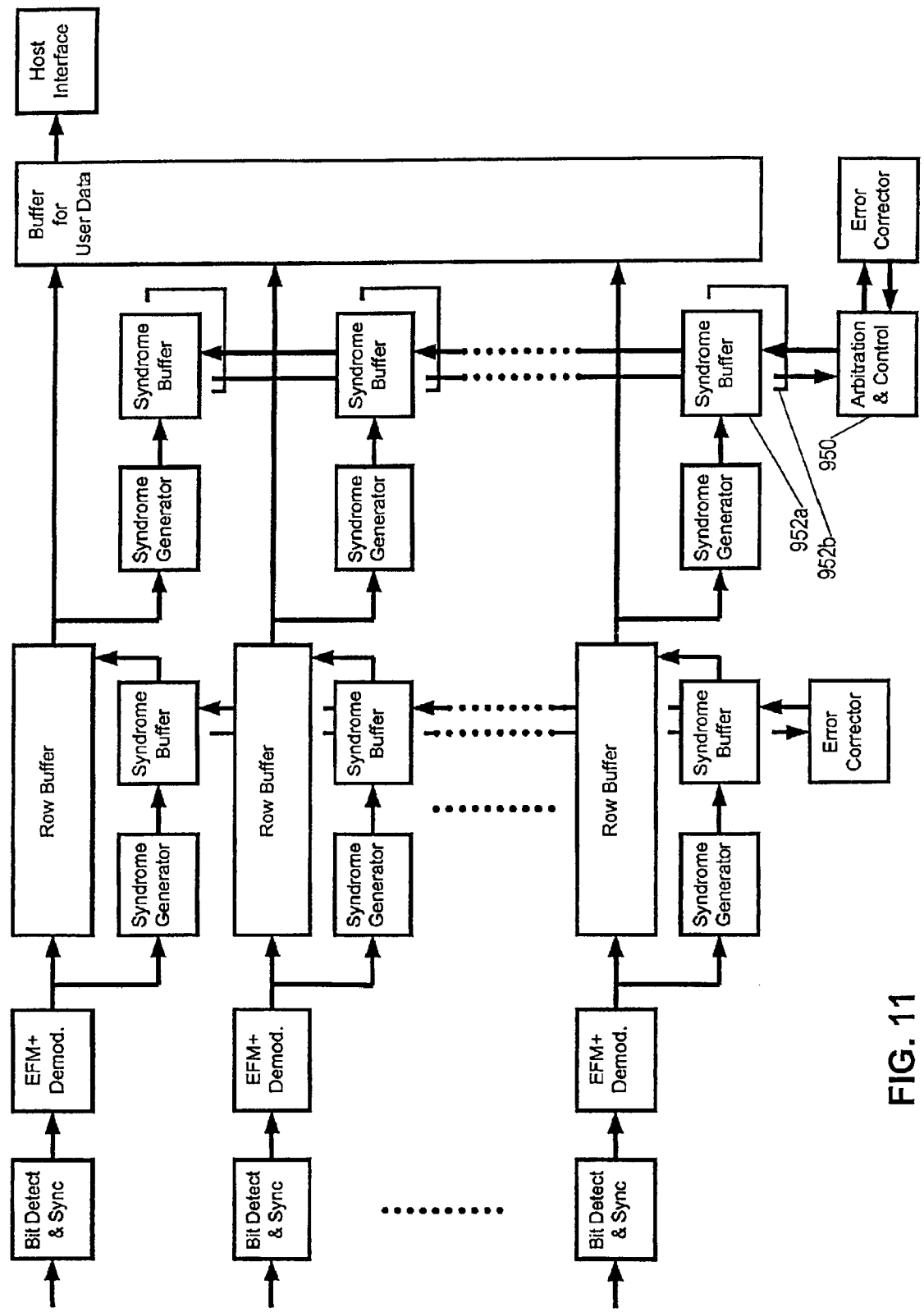
FIG. 11 shows in block form a multi-beam DVD decoder circuit according to a second embodiment of the invention.
Figure 12:
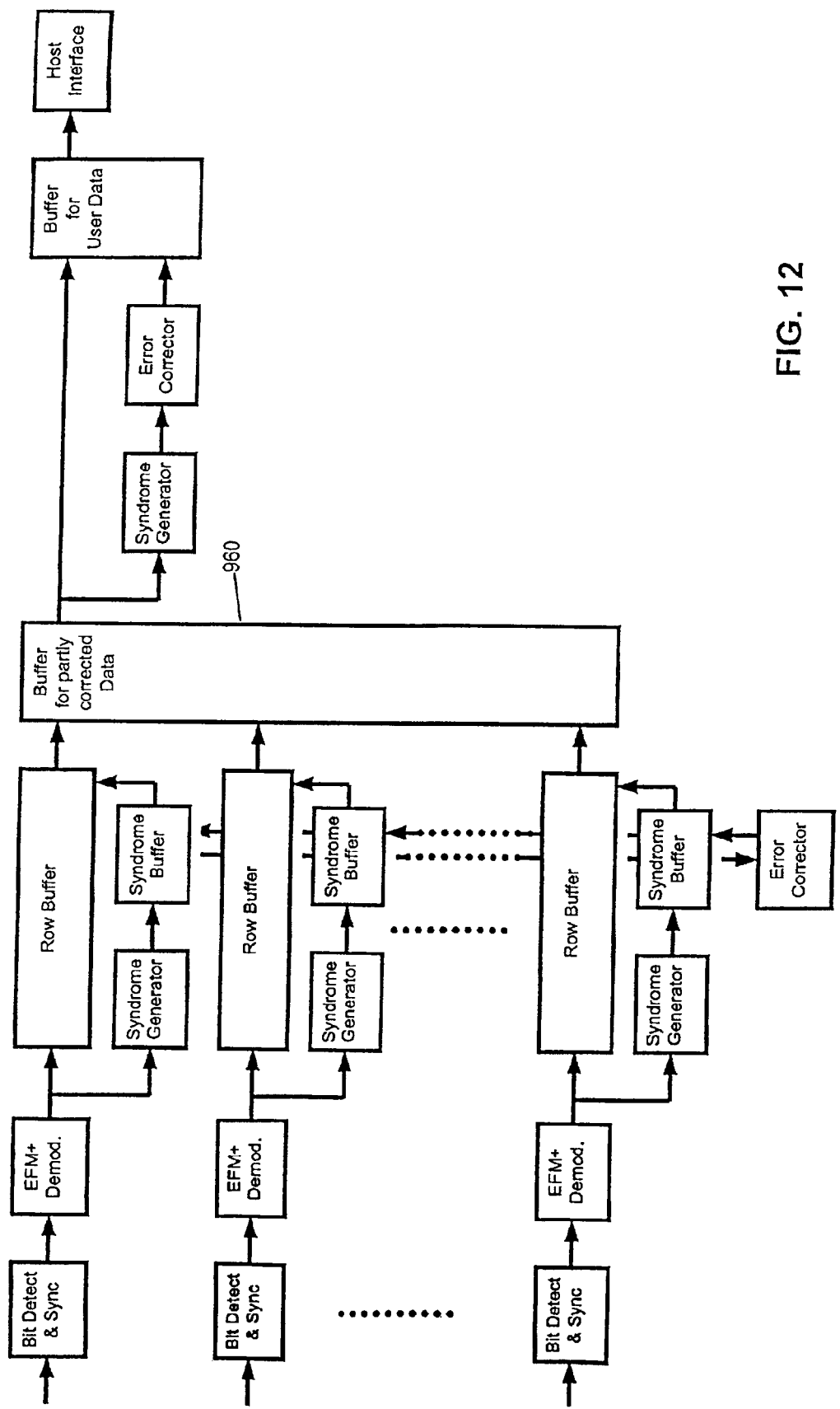
FIG. 12 shows in block form a multi-beam DVD decoder circuit according to a third embodiment of the invention.

Two alternative systems will now be described, in which recombination occurs at different points in the DVD data path, and in which syndrome caching is again applied. FIGS. 11 and 12 show these at the same level of detail as FIG. 7. The skilled reader will readily appreciate the additional modules and adaptations of existing modules which will be necessary in any detailed implementation.

Second Example—Stream Recombination Based on EDC Frames

FIG. 11 shows an alternative multi-track read path based on EDC frames. Outer syndrome calculation could be performed in a system with N separate row buffers, N inner ERCO syndrome generators and N inner ERCO syndrome buffers. For the inner error correction, a common error correction circuit is used dynamically in turn as inner syndromes become available.

As already outlined in relation to the first example, there are 2N or approximately 28 Kbytes of syndrome storage needed, assuming N=7 and that partial syndromes are transferred into external memory. Otherwise, 3N−1 would be needed, to accommodate the partial syndromes for EDC sectors whose boundaries are not aligned with the jumping-in point. As in the inner ERCO circuitry, the outer error corrector in this example is shared between channels, having access to the syndromes that are complete, and waiting in the syndrome buffers, to be processed. The association of syndrome buffers to input channels and the handling of partially generated syndromes is dynamic, rather than this is implemented in an arbitration and control logic 950.

The two syndrome buffers 952a and 952b in each channel are used in the following way:

One buffer is used for the calculation of the current syndrome.

The other buffer during this time is used for the syndrome application to the error corrector:

one syndrome (16 bytes) is taken out of the buffer and applied to the corrector the corrections are written back into the buffer once all syndromes have been processed, the entire set of corrections are transferred to the user data buffer (double buffering).

When only part of the syndrome is calculated after a jump, it is not possible to initiate the error correction process. In this case the set of partially corrected syndromes is stored in external memory both buffers are available for the standard correction process described above.

In the case that the missing information for the completion of a partial syndrome is coming in via one of the input channels, a second partial syndrome is calculated once the second partial syndrome contains all the information missing from the first part, syndrome generation is stopped (also data transfer into user buffer memory can be stopped).

The first part of the syndrome is now retrieved from the external memory and combined with the second part in the currently used syndrome buffer.

Error correction is initiated.

The second syndrome buffer is available for syndrome generation in the normal way.

Advantages of this example are:

Utilizes blocks from existing data-path architecture.

Scalable to high-performance systems where x-performance is only limited by the memory interface (A 32-bit memory interface allows approx. 64×DVD, a 64-bit memory interface up to 128×DVD)

Trade-off between area and performance possible. This would be by adding parallel error correction modules, instead of sharing.

Power consumption can be controlled by keeping clock frequency in the N channels to a minimum.

Works on EDC recording sectors.

New circuit blocks are required for:

Control logic for syndrome buffer handling, especially transfer of partial syndromes to and from external memory.

Arbitration logic for shared error correction module in inner and outer error correction section.

The existing buffer manager with its arbitration logic must be extended by N−1 additional input channels.

On the other hand, the actual bit detection and error correction functionality can be performed by existing blocks. The host interface can be re-used without changes.

Third Example—Stream Recombination after Inner Error Correction

As described in relation FIG. 2, the DVD decode path consists of bit detection, inner error correction, outer error correction and user data buffer. The first example has considered stream recombination after the bit detection/EFM+ decoding, while the second example recombined the data streams only after outer error correction. There is now described a third alternative multi-beam DVD decoder architecture, where stream recombination occurs after inner error correction.

Figure 7:
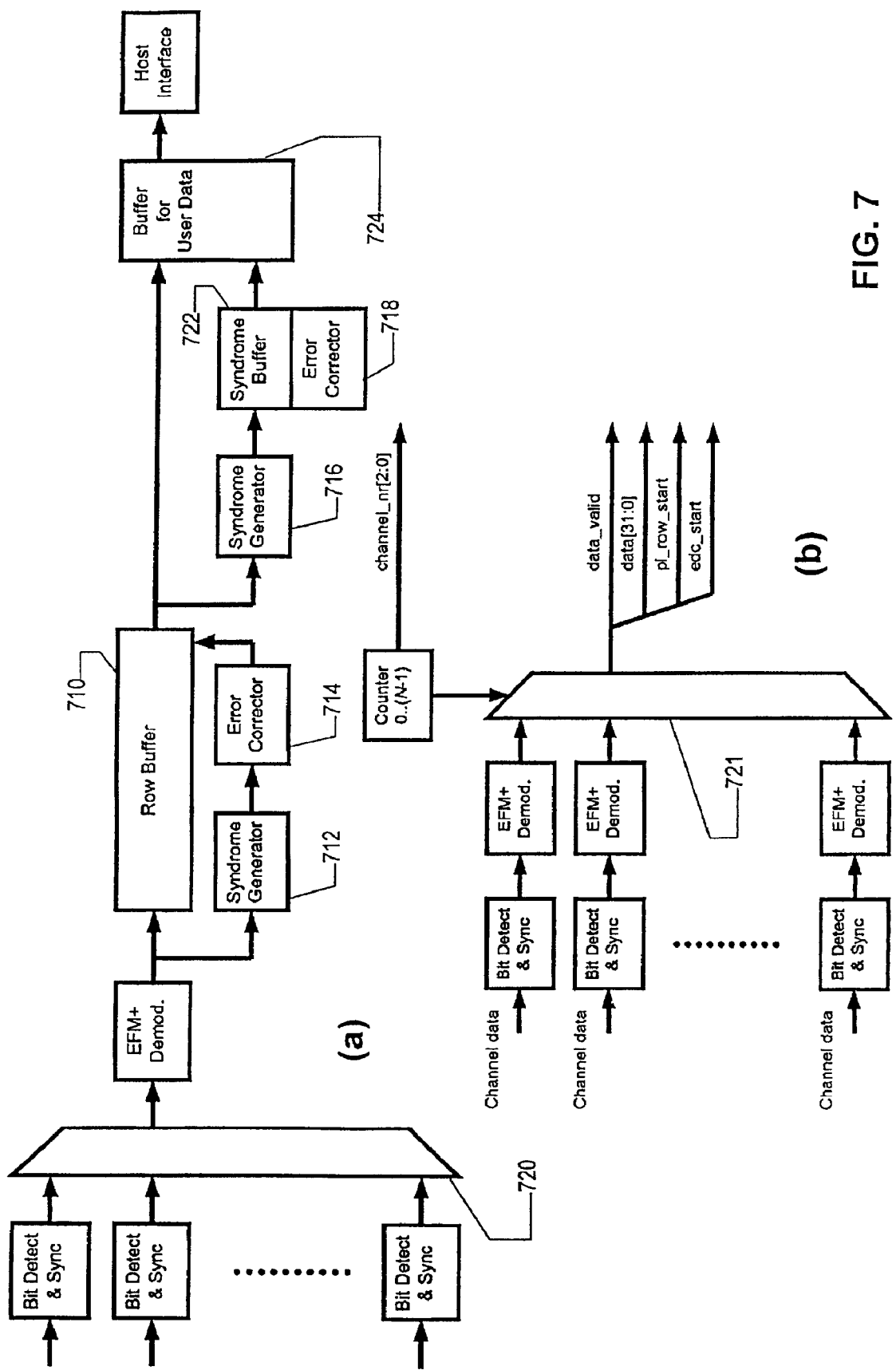
FIG. 7 shows in block form a multi-beam DVD decoder circuit according to a first embodiment of the invention, with variations (a) and (b)

FIG. 12 shows a block diagram of this architecture. The skilled reader will by now understand the functions of the various blocks in the diagram. The inner corrections which are just based on distinct rows of the ECC frame or block are performed in N individual channels. As with previous architectures, the inner error corrector can be shared across the N channels. Having performed the inner corrections, the resulting data (not just the syndromes) can be stored in a buffer 960 where the ECC frames are reconstructed. Alternatively, the data could be recombined using a multiplexer instead of a buffer, as used in the first example (FIG. 7). The implications of this on the syndrome handling in the outer error corrector section have already been described in detail, with reference to FIG. 10 in particular.

Overall, it can be said that this structure, which is a mixture of the architectures shown in FIG. 7 and FIG. 11, does not provide any particular benefits or shortcomings. The most important shortcomings are probably that the cost of the inner correction sections are quite high while, at the same time, the sequential correction in the outer error correction section limits the performance.

Compared with conventional designs, the system of FIG. 12 requires arbitration circuitry for the inner error corrector module. Also it requires either Buffer for raw data; this buffer should be integrated with the user data buffer in order to keep the pin count low. Control logic is needed that generates addresses for the data transferred via the N input channels, identifies whether all data from an entire disc revolution has been received, and reconstruction of the serial data stream. Also an additional input channel must be added to the user data buffer.

OR

Control logic in the outer error correction section that maintains a set of syndrome buffers and assigns those to the input channels. This logic also needs to identify which syndromes are complete and available for error correction. Furthermore, addresses or address indices for the user data buffer (data and corrections) must be generated.

The actual bit detection, demodulation, syndrome and error correction as well as the host interface can be performed by existing blocks.

The above examples illustrate how the use of caching for partial syndromes, in particular, permits efficient implementations of a multi-beam DVD drives, without excessive cost. Double buffering is also seen, which can be used in combination with caching of partial syndromes.

The invention, and the techniques disclosed herein are not limited to the DVD system, nor to optical discs in general. In particular, other systems may be known or envisaged which employ a block-based error protection scheme, and where parallel processing of different parts of the data leads to the generation of partial syndromes and corrections.

What is claimed is:

1. A method of reproducing data recorded as blocks of a predetermined size each block having an error protection code applied thereto and comprising a series of several sub-blocks, the method comprising:

(a) reading in parallel a set of N sub-sequences of data starting at N respective locations chosen without restriction to boundaries of said blocks or sub-blocks, the set of N sub-sequences of data encompassing a contiguous portion of a first sequence of data;

(b) during said reading step, identifying within each sub-sequence a series of sub-blocks forming a part of a block and, in the absence of data from the start of the block, processing the series of sub-blocks in accordance with predetermined rules to accumulate a partial syndrome relating to a complete syndrome for the block, obtained by applying the error protection code to the block including all sub-blocks thereof;

(c) upon reaching the end of the block, accumulating a syndrome for a next block within the sub-sequence;

(d) during said reading step subsequently identifying in another of said sub-sequences a series of sub-blocks forming a starting part of the block whose end part has been processed and processing said sub-blocks to accumulate a remainder syndrome relating to the complete syndrome for the block; and (e) combining the remainder syndrome with the partial syndrome so as to obtain the complete syndrome for the block.

2. A method as claimed in claim 1 wherein the method further comprises (f) jumping to a new set of locations in said first sequence and reading in parallel a further group of N sub-sequences to cover a further portion of the first sequence, said further portion being contiguous or overlapping with the preceding one, while step (d) includes identifying said starting part of the block among the further group of sub-sequences.

3. A method as claimed in claim 1 wherein said sub-blocks are regarded as rows or groups of rows of a two-dimensional matrix, step (b) including performing an toner error correction on rows the matrix, while the syndrome accumulated in steps (c)–(e) is applied to columns of the matrix in a outer correction process.

4. A method as claimed in claim 1 wherein the method is performed using distinct local and remote storage for temporary storage of syndromes, said partial syndrome being accumulated in local storage in step (b); the accumulated partial syndrome being transferred to said remote storage in step (c).

5. A method as claimed in claim 4 wherein said transferring step (c) is performed each time in association with said jumping step.

6. A method as claimed in claim 1 wherein the partial syndromes are combined during reading of the starting part of the block, said partial syndrome being transferred from the remote storage back to the local storage in step (d) for accumulation of the remainder of said syndrome in said local storage.

7. A method as claimed in claim 6 wherein said partial syndrome and the accumulated remainder are combined away from said local storage.

8. A method as claimed in claim 1 wherein the local storage provides fewer than 5N/2 syndrome buffers.

9. A method as claimed in claim 1 wherein the local storage provides fewer than 3N/2 syndrome buffers.

10. A method as claimed in claim 1 wherein the data recorded in said first sequence comprises data recorded in a spiral on a disc-like record carrier.

11. A method as claimed in claim 1 for use in an apparatus for reproducing data stored on a record carrier, the apparatus comprising disc transport means including a pickup for reading data from the carrier, signal processing means for recovering data from the carrier and a decoder for decoding and error-correcting the data read from the carrier, in accordance with error correcting codes included therein, wherein the pickup is adapted for reading multiple-channels in parallel to recover plural sub-sequences of a first sequence of data recorded on the carrier.

12. A method as claimed in claim 1 for use in a decoder comprising input means for receiving in parallel plural sub-sequences of a first sequence of data to be decoded.

13. A method as claimed in claim 12 wherein the decoder comprises an integrated circuit including inner and outer correction error correctors, and buffers for the storage of at least one outer error correction syndrome per channel, and means for transferring a partial syndrome to external memory after encountering the end of a block of data.

* * * * *